United States Patent
Denzner et al.

(10) Patent No.: US 10,566,909 B2
(45) Date of Patent: Feb. 18, 2020

(54) DC-DC CONVERTER AND METHOD FOR OPERATING SAME

(71) Applicant: SIEMENS AKTIENGESELLSCHAFT, München (DE)

(72) Inventors: Michael Denzner, Nürnberg (DE); Christopher Fromme, Fürth (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 16/461,242

(22) PCT Filed: Nov. 6, 2017

(86) PCT No.: PCT/EP2017/078331
§ 371 (c)(1),
(2) Date: May 15, 2019

(87) PCT Pub. No.: WO2018/091299
PCT Pub. Date: May 24, 2018

(65) Prior Publication Data
US 2019/0319542 A1    Oct. 17, 2019

(30) Foreign Application Priority Data

Nov. 21, 2016  (EP) .................................... 16199837

(51) Int. Cl.
*H02M 3/335*    (2006.01)
*H02M 1/08*    (2006.01)
(Continued)

(52) U.S. Cl.
CPC ......... *H02M 3/33576* (2013.01); *H02M 1/08* (2013.01); *H02M 3/3376* (2013.01); *H02M 3/33592* (2013.01); *H02M 2001/0054* (2013.01)

(58) Field of Classification Search
CPC ........... H02M 3/33592; H02M 3/3376; H02M 3/33576
(Continued)

(56) References Cited

U.S. PATENT DOCUMENTS

RE36,098 E  *  2/1999  Vinciarelli ........ H02M 3/33538
                                                363/20
6,388,896 B1    5/2002  Cuk
(Continued)

FOREIGN PATENT DOCUMENTS

DE    10 2015 012 343 A1    4/2016
EP         2 528 218 A2    11/2012

OTHER PUBLICATIONS

PCT International Search Report and Written Opinion of International Searching Authority dated Jan. 19, 2018 corresponding to PCT International Application No. PCT/EP2017/078331 filed Nov. 6, 2017.

*Primary Examiner* — Gary A Nash
(74) *Attorney, Agent, or Firm* — Henry M. Feiereisen LLC

(57) ABSTRACT

A DC-DC converter and a method for operating the same are disclosed. The DC-DC converter includes an inverter, a transformer, a rectifier, a clamping assembly, and a control unit. The inverter has four interconnected primary semiconductor switches which form an inverter full bridge for converting an input DC voltage into an AC voltage. The transformer has a primary winding which is arranged in the bridge branch of the inverter full bridge. The rectifier is connected to the secondary winding of the transformer and
(Continued)

is designed to rectify a secondary voltage of the transformer. The clamping assembly has an additional semiconductor switch and a clamping capacitor which is connected to the additional semiconductor switch in series. The rectified secondary voltage of the transformer is applied to the clamping assembly. The control unit is designed to control the primary semiconductor switches and the additional semiconductor switch.

10 Claims, 5 Drawing Sheets

(51) Int. Cl.
  *H02M 1/00* (2006.01)
  *H02M 3/337* (2006.01)

(58) Field of Classification Search
  USPC ......... 363/17, 19, 21.06, 53, 56.12, 78, 132, 363/134
  See application file for complete search history.

(56) References Cited

U.S. PATENT DOCUMENTS

| | | | |
|---|---|---|---|
| 8,787,042 B2* | 7/2014 | Nozaki | H02M 3/3378 363/21.03 |
| 2012/0300501 A1* | 11/2012 | Kojima | H02M 3/33576 363/17 |
| 2015/0188411 A1* | 7/2015 | Lipcsei | H02M 3/33576 363/53 |
| 2015/0214847 A1 | 7/2015 | Shimada et al. | |

* cited by examiner

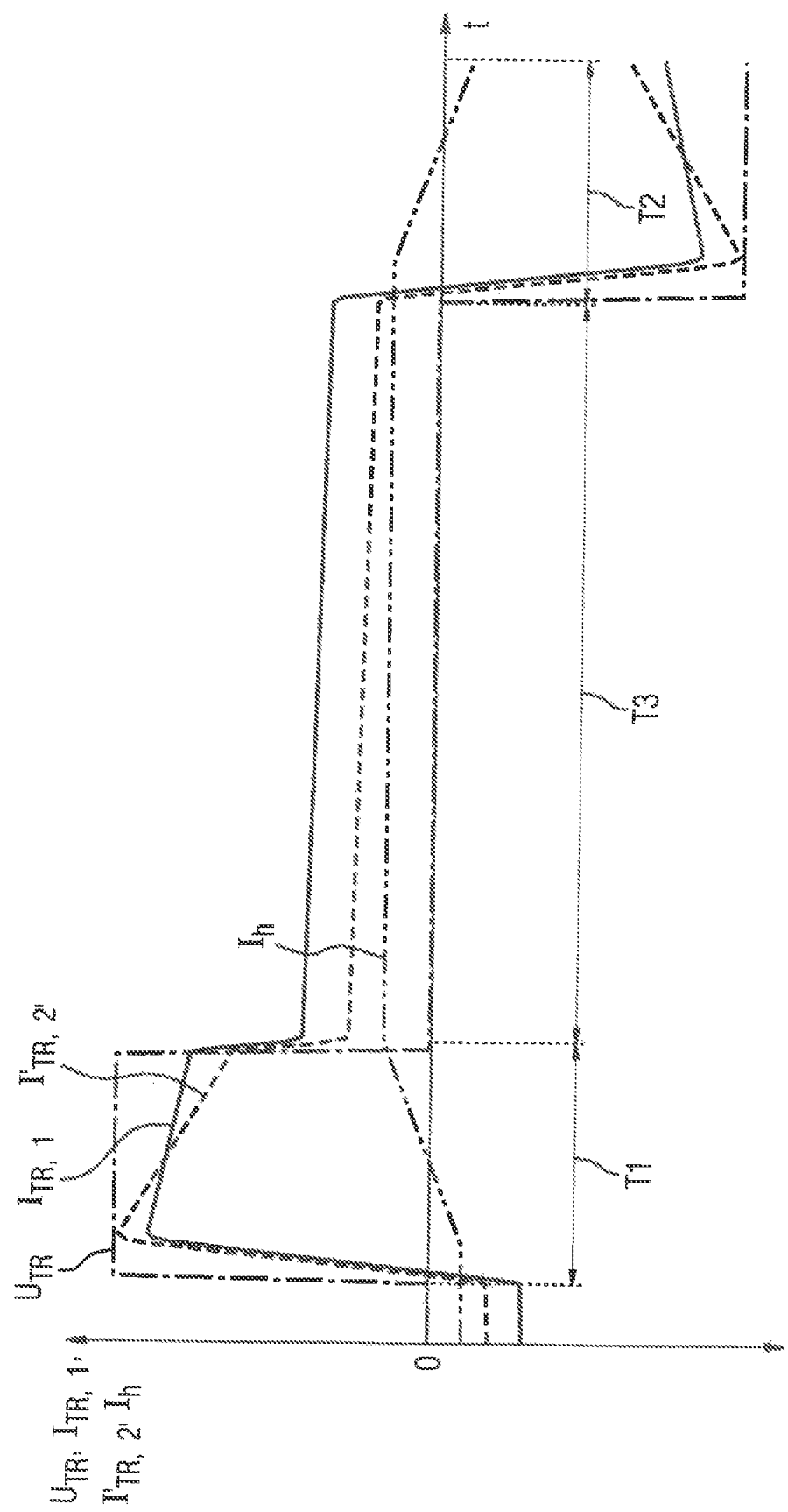

US 10,566,909 B2

1

DC-DC CONVERTER AND METHOD FOR OPERATING SAME

CROSS-REFERENCES TO RELATED APPLICATIONS

This application is the U.S. National Stage of Intentional Application No. PCT/EP2017/078331, filed Nov. 6, 2017, which designated the United States and has been published as International Publication No. WO 2018/091299 and which claims the priority of European Patent Application, Serial No. 16199837.2, filed Nov. 21, 2016, pursuant to 35 U.S.C. 119(a)-(d).

BACKGROUND OF THE INVENTION

The invention relates to a DC-DC converter which is configured as a phase-shifted tuft-bridge converter, i.e. as a full-bridge push-pull converter with phase-modulated actuation.

A DC-DC converter of this type has four semiconductor switches connected together to form a tuft-bridge for converting an input DC voltage into an AC voltage, a transformer to which, on the primary winding side, the AC voltage is applied, and a rectifier for rectifying the secondary voltage of the transformer. The AC voltage generated by the inverter alternatingly assumes an upper voltage level during a first active phase and during a second active phase, a lower voltage level. Between two successive active phases, the transformer is operated in a freewheeling phase in which the transformer is short-circuited on the primary side.

As well as the known advantages, in particular the zero-voltage switching, such a DC-DC converter also has disadvantages. For example, during the freewheeling phases, a freewheeling current, which is to enable the zero-voltage switching, flows in the primary side. The amount of the freewheeling current which is required to achieve the zero-voltage switching depends upon the input DC voltage. The amount of the freewheeling current that eventually becomes established depends, however, on the load current. According to the input DC voltage and the load current, a freewheeling current can therefore become established, the amount of which is significantly greater than would be required to achieve the zero-voltage switching. As a result, the primary side effective current is very large, which can cause significant conductive losses. Similarly, a free-wheeling current can become established which is insufficient to enable the zero-voltage switching, which can cause significant switching losses.

Furthermore, on the secondary side, the leakage inductances of the transformer and the parasitic capacitances of the rectifier result in an oscillation-susceptible system. By means of reverse currents in the rectifier, an oscillation thus arises, the amplitude of which, depending on the structure of the DC-DC converter, can lie far above the transformed primary voltage and which can be sustained over the entire active phase.

US 2015/0214847 A1 discloses a DC-DC converter in which between the DC terminals of a circuit, a smoothing capacitor and a voltage clamping circuit are connected. The voltage clamping circuit has a circuit device and a clamping capacitor.

DE 10 2015 012 343 A1 discloses a DC-DC conversion device of a motor vehicle, which is configured to convert an input DC voltage provided by an electrical energy source of the motor vehicle into a pre-determined output DC voltage for an on-board network of the motor vehicle. The DC-DC conversion device comprises, for increasing and/or smoothing the input DC voltage, an impedance source with two coils and two capacitors.

EP 2 258 218 A2 discloses a DC supply with a resonant circuit on a secondary side of a transformer for suppressing a surge voltage during the restoration of the output of diodes which form a rectifier circuit.

U.S. Pat. No. 6,388,896 B1 discloses a DC-DC converter with an input induction winding, a middle induction winding and an output induction winding which are arranged on a common magnetic core.

It is an object of the invention to provide an improved DC-DC converter which is configured as a phase-shifted full-bridge converter, and a method for operating it.

SUMMARY OF THE INVENTION

According to one aspect of the invention, the object is achieved by an DC-DC converter which comprises an inverter, a transformer, a rectifier, a clamping assembly and a control unit. The inverter comprises four primary semiconductor switches connected together to form an inverter full-bridge for converting an input DC voltage into an AC voltage. The transformer has a primary winding arranged in the bridge branch of the inverter full-bridge and a secondary winding. The rectifier is connected to the secondary winding and is configured for rectifying a secondary voltage of the transformer. The clamping assembly has an additional semiconductor switch and a clamping capacitor connected in series with the additional semiconductor switch. The rectified secondary voltage of the transformer is applied to the clamping assembly. The control unit is configured for actuating the primary semiconductor switches and the additional semiconductor switch.

Advantageous embodiments of the invention are the subject matter of the subclaims.

The formulation that the transformer has a primary winding arranged in the bridge branch of the inverter full-bridge and a secondary winding should be understood to mean that the transformer has at least one such primary winding and at least one secondary winding, i.e. the formulation does not preclude the transformer having more than one such primary winding and/or more than one secondary winding. Accordingly, the formulations below relating to the primary winding and the secondary winding relate to every such primary winding and every secondary winding of the transformer.

A DC-DC converter according to the invention is thus configured as a so-called phase-shifted full-bridge converter which comprises a clamping assembly on the secondary side of the transformer. The clamping assembly enables, firstly, a setting of a primary current which flows during a freewheeling phase as a primary freewheeling current through the primary winding of the transformer and, secondly, a clamping of the secondary voltage.

Herein, use is made thereof that the primary freewheeling current can be influenced by the clamping assembly when the additional semiconductor switch of the clamping assembly is switched off after the start of each freewheeling phase and is switched on after the start of each active phase. The size of the primary freewheeling current depends essentially on the time point at which the additional semiconductor switch is switched off after the start of a freewheeling phase. Beyond this time point, the primary freewheeling current can thus be set, in order advantageously to reduce conductive losses in the primary semiconductor switch caused through primary freewheeling currents and in the primary winding and to increase the efficiency of the DC-DC converter. By means of the clamping of the secondary voltage by means of the clamping assembly, further advantageously, oscillations of the secondary voltage can be significantly reduced or prevented, so that the structure of the rectifier can be optimized, since its components do not have to be configured for oscillations of the secondary voltage with large amplitudes.

An embodiment of the DC-DC converter provides that the rectifier comprises four secondary semiconductor switches which are actuatable by the control unit and are connected together to form a rectifier full-bridge, the secondary winding of the transformer is arranged in the bridge branch of the rectifier full-bridge and the clamping assembly is connected in parallel with the rectifier full-bridge. This embodiment of the DC-DC converter thus provides an active rectifier which is controllable by means of secondary semiconductor switches. The configuration of the rectifier as an active rectifier advantageously enables an optimization of the output and the efficiency of the DC-DC converter by means of a suitable actuation of the secondary semiconductor switch.

A further embodiment of the DC-DC converter provides that the rectifier comprises on the output side an LC filter with a choke and a filter capacitor. The LC filter advantageously enables a smoothing of the rectified secondary voltage of the transformer in order to achieve the most constant possible output voltage of the DC-DC converter.

A further embodiment of the DC-DC converter provides that each primary semiconductor switch and/or each secondary semiconductor switch and/or the additional semiconductor switch is configured as a field-effect transistor, for example as a MOSFET (=Metal Oxide Semiconductor Field-Effect Transistor). The use of field-effect transistors has the advantage, for example, over the use of bipolar transistors with insulated-gate electrode (IGBT) of relatively low switching losses, in particular on switching off the semiconductor switch.

The invention provides that the transformer is an air gap transformer. Compared with a transformer without an air gap, an air gap transformer enables a greater tolerance to asymmetries in the actuation of the primary semiconductor switch. Such asymmetries can lead, in the case of a full-bridge converter, thereto that the primary voltage of the transformer obtains a direct current component. If the direct current component is large enough, the transformer can become saturated, which absolutely must be prevented. In an air gap transformer, the saturation current is much higher than in a transformer without an air gap. In order to bring the transformer to saturation, the primary current in an air gap transformer must therefore have a significantly greater direct current component than in a transformer without an air gap. However, this direct current component is counteracted by the ohmic resistances of the air gap transformer itself, the conductor tracks on the circuit board and the primary semiconductor switches. Therefore, a DC-DC converter with an air gap transformer has a greater tolerance to asymmetries in the actuation of the primary semiconductor switch than a DC-DC converter having a transformer without an air gap. Without the clamping assembly, however, the use of an air gap transformer would have the severe disadvantage that due to the greater magnetization current that an air gap transformer has compared with an otherwise similar transformer without an air gap, a larger primary current would permanently flow than in a transformer without an air gap. Since, however, by means of the clamping assembly the freewheeling current can be set, this disadvantage in the freewheeling phase is dispensed with and the RMS value of the freewheeling current can even be reduced on the secondary side. In addition, in relation to the clamping assembly, improved current flows are produced so that in the active phases, the RMS value of the primary current also does not rise and can also be reduced. The advantage of the use of an air gap transformer therefore arises only in connection with the clamping assembly.

According to another aspect of the invention, the object is achieved by a method for operating an inventive DC-DC converter, wherein an AC voltage, which alternatingly during a first active phase assumes an upper voltage level and during a second active phase, a lower voltage level, is generated by the inverter, and the transformer is operated between, in each case, two successive active phases, in a freewheeling phase in which the primary winding is short-circuited. The clamping assembly is switched off by the additional semiconductor switch after the start of each freewheeling phase and switched on after the start of each active phase.

As has already stated above, the switching on of the clamping assembly after the start of each active phase and the switching-off of the clamping assembly after the start of each freewheeling phase enables the influencing of the primary freewheeling currents during the freewheeling phases and thereby the reduction of conductive losses of the primary semiconductor switches and the primary winding due to primary freewheeling currents.

In addition, the zero-voltage switching is also enabled in part-load regions in which a conventional phase-shifted full-bridge converter can no longer achieve zero-voltage switching. This is thereby enabled that, in an active phase, the primary freewheeling current can also be set higher than the primary current. By this means, the good EMC (electromagnetic compatibility) properties of the DC-DC converter can be obtained, above all, since hard switching edges can be further prevented.

Furthermore, with the clamping of the secondary voltage by means of the clamping assembly, advantageously, oscillations of the secondary voltage can be significantly reduced or prevented.

The method further provides that a switching-off delay duration is used for the switching-off of the clamping assembly following the start of a freewheeling phase as a manipulated variable for a regulation of a primary current which flows during the freewheeling phase as a primary freewheeling current through the primary winding of the transformer and which is adjusted, by means of the switching-off delay duration, to a target value. The target value of the primary freewheeling current is determined, for example, dependent upon the input DC voltage and/or an output current of the DC-DC converter. This embodiment of the method makes use of the fact that the size of the primary freewheeling current depends essentially on the time point at which the clamping assembly is switched off after the start of a freewheeling phase, since the later this time point is set (within a small useful window), the smaller the primary freewheeling current becomes. Therefore, the switching-off delay duration is suitable as a manipulated variable for regulating a primary freewheeling current to a target value.

A further embodiment of the method provides that the clamping assembly is switched on after the start of an active phase at a time point at which the rectified secondary voltage of the transformer has reached an end value in this active phase. By this means, the time point of the clamping of the secondary voltage for suppressing oscillations of the rectified secondary voltage is advantageously adjusted. Specifically, as soon as the rectified secondary voltage has reached its end value, a current flows via the additional semiconductor switch into the clamping capacitor. Precisely this is the current that would otherwise excite oscillations of the rectified secondary voltage. The oscillations are thus prevented or severely reduced. Through the switching-on of the clamping assembly, the clamping capacitor can feed the previously absorbed energy back again and emit it at the output of the DC-DC converter. The sooner the clamping assembly is switched on by the additional semiconductor switch, the smaller the losses will be. If, however, the clamping assembly were switched on too soon, the clamping capacitor would be short-circuited across the rectifier and would destroy components of the rectifier, for example, secondary semiconductor switches in the case of an active rectifier.

A further embodiment of the method provides that the rectifier is switched active after the start of each active phase delayed by a switching-active delay duration if the rectifier comprises four secondary semiconductor switches which are actuatable by the control unit and are connected together to form a rectifier full-bridge, and the secondary winding of the transformer is arranged in the bridge branch of the rectifier full-bridge. The switching-active delay duration is preferably shorter than or equal to a commutation duration of a secondary side commutation process after the start of the respective active phase.

The switching-active delay duration is determined, for example, dependent upon at least one of the following parameters:
  input DC voltage,
  main inductance of the transformer,
  primary leakage inductance of the transformer,
  secondary leakage inductance of the transformer,
  duration of the preceding active phase,
  output current of the DC-DC converter at the time point of the start of the active phase,
  primary current through the primary winding at the time point of the start of the active phase.

Furthermore, for example, a switching-passive delay duration is specified and the rectifier is switched passive after each switching-off of the clamping assembly, delayed by the switching-passive delay duration.

The aforementioned embodiments of the method therefore relate to the realization of the DC-DC converter with an active rectifier. A switching-active of the rectifier is understood to mean a switching state of the secondary semiconductor switch in which the secondary voltage of the transformer is applied with a defined polarity to the output of the rectifier. A switching-passive of the rectifier is understood to mean a switching state of the secondary semiconductor switches in which all the secondary semiconductor switches are switched on so that the bridge branch of the rectifier full-bridge is short-circuited. Due to the delay of the switching-active of the rectifier after the start of the respective active phase, advantageously, conductive losses which would arise in too early a switching-active of the rectifier by means of a current flow through body diodes of the secondary semiconductor switches are prevented. Through a switching-active of the rectifier at the end or before the end of the secondary side commutation process, it is advantageously taken into account that a switching-active after the end of the commutation process corresponds to a secondary-side short-circuiting of the transformer and would thereby lead to excessively large currents, and losses caused thereby. Particularly preferably, the rectifier is therefore switched active as shortly as possible before the end of the commutation process. Since the duration of the commutation process depends on the specified parameters, the switching-active delay duration is preferably determined dependent upon these parameters. The switching-passive delay duration is relatively less relevant for the efficiency of the DC-DC converter and can therefore be firmly defined and firmly set.

BRIEF DESCRIPTION OF THE DRAWING

The above-described properties, features and advantages of this invention and the manner in which these are achieved will now be described more clearly and intelligibly in relation to exemplary embodiments, and illustrated in detail by reference to the drawings. In the drawings:

FIG. 5 shows temporal progressions of a primary voltage, a primary current, a magnetization current and a transformed secondary current in an embodiment of a DC-DC converter having a transformer with an air gap.

DETAILED DESCRIPTION OF PREFERRED EMBODIMENTS

Parts which correspond to one another are provided with the same reference signs in all the drawings.

Figure 1:
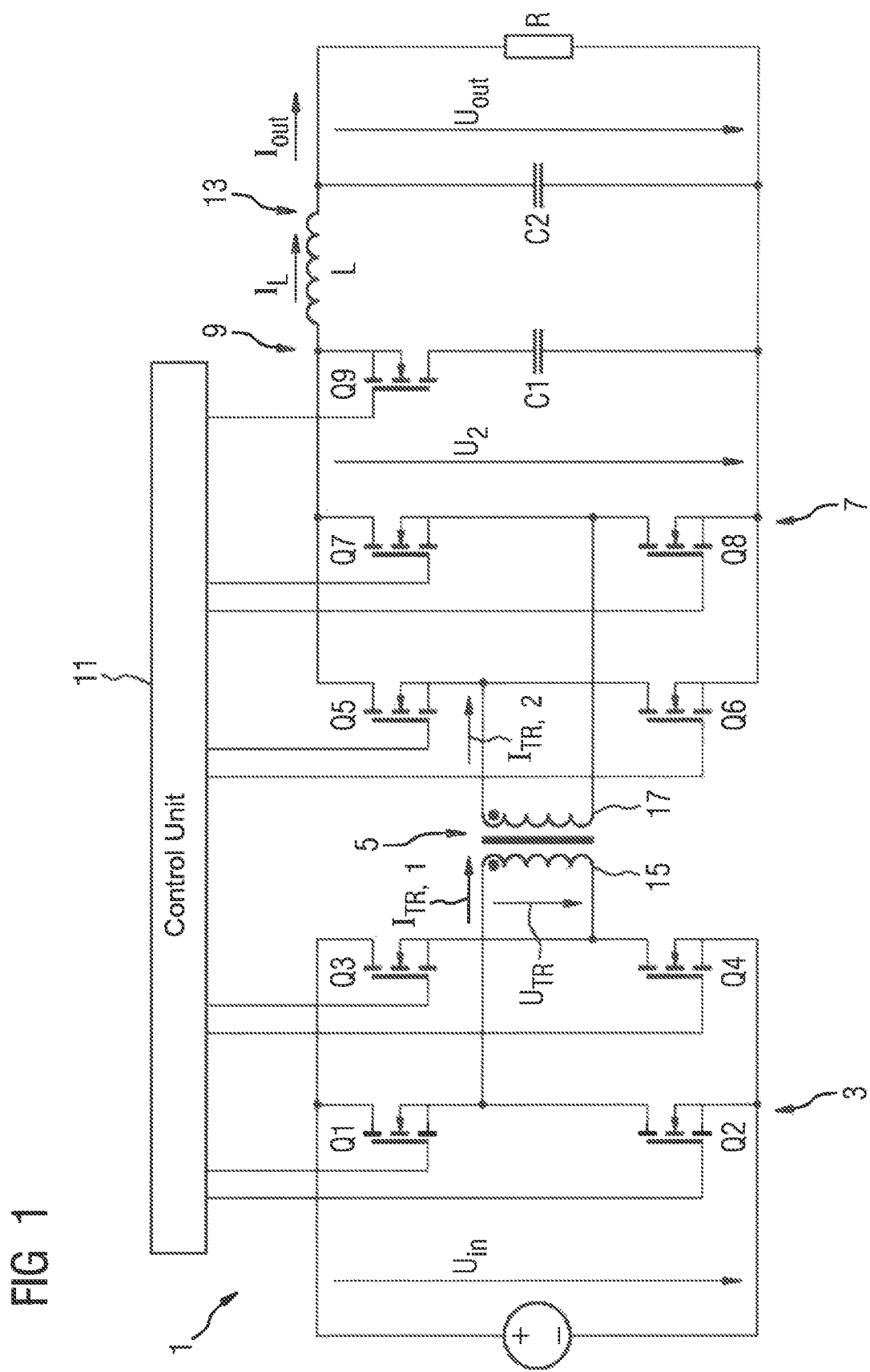
FIG. 1 shows a circuit diagram of a DC-DC converter.

FIG. 1 shows a circuit diagram of a DC-DC converter 1. The DC-DC converter 1 comprises an inverter 3, a transformer 5, a rectifier 7, a clamping assembly 9 and a control unit 11.

The inverter 3 has four primary semiconductor switches Q1 to Q4 connected together to form an inverter full-bridge for converting an input DC voltage $U_{in}$ into an AC voltage.

The rectifier 7 has four secondary semiconductor switches Q5 to Q8 connected together to form a rectifier full-bridge for rectifying a secondary voltage of the transformer 5 and, on the output side, an LC filter 13 with a choke L and a filter capacitor C2. A choke current $I_L$ flows through the choke L. On the output side, an output current $I_{out}$ is output by the rectifier 7.

The transformer 5 has a primary winding 15 and a secondary winding 17. The primary winding 15 is arranged in the bridge branch of the inverter full-bridge. The secondary winding 17 is arranged in the bridge branch of the rectifier full-bridge. A primary current $I_{TR,1}$ flows through the primary winding 15. A secondary current $I_{TR,2}$ flows through the secondary winding 17. A primary voltage $U_{TR}$ is applied at the primary winding 15.

The clamping assembly 9 is connected in parallel with the rectifier full-bridge between the rectifier full-bridge and the LC filter 13 and has an additional semiconductor switch Q9 and a clamping capacitor C1 connected in series. The rectified secondary voltage $U_2$ of the transformer 5 is applied to the clamping assembly 9.

Each semiconductor switch Q1 to Q9 is configured as a field-effect transistor or, more specifically, a normally blocking n-channel MOSFET (Metal Oxide Semiconductor Field-Effect Transistor). Each half-bridge of the inverter full-bridge has a first primary semiconductor switch Q1, Q3, the source of which is connected to the bridge branch of the inverter full-bridge, and a second primary semiconductor switch Q2, Q4, the drain of which is connected to the bridge branch of the inverter full-bridge. Each half-bridge of the inverter full-bridge has a first secondary semiconductor switch Q5, Q7, the source of which is connected to the bridge branch of the rectifier full-bridge, and a second secondary semiconductor switch Q6, Q8, the drain of which is connected to the bridge branch of the rectifier full-bridge. The source of the additional semiconductor switch Q9 is connected to the drains of the two first secondary semiconductor switches Q5, Q7, and the drain of the additional semiconductor switch Q9 is connected to the clamping capacitor C1.

The control unit 11 is configured for actuating the semiconductor switches Q1 to Q9. For the sake of clarity, in FIG. 1, the connections of the control unit 11 to the semiconductor switches Q1 to Q9 are shown purely schematically in that for each semiconductor switch Q1 to Q9, only one connection of the control unit 11 to the gate of the semiconductor switch Q1 to Q9 is shown.

Also shown in FIG. 1 is a load R to which is applied an output voltage $U_{out}$ of the rectifier 7.

Figure 2:
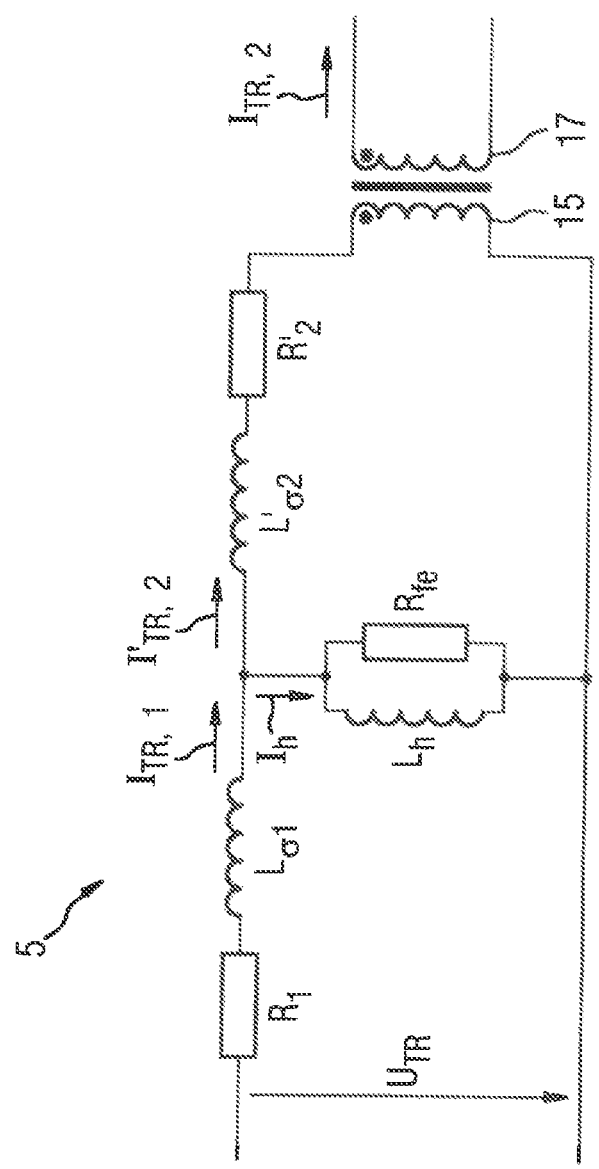
FIG. 2 shows an equivalent circuit diagram of a transformer of a DC-DC converter.

FIG. 2 shows an equivalent circuit diagram of the transformer 5 of the DC-DC converter 1. Here, $R_1$ signifies a primary ohmic resistance of the transformer 5, $L_{\sigma 1}$ a primary leakage inductance of the transformer 5, $I_h$ a magnetizing current of the transformer 5, $L_h$ a main inductance of the transformer 5, $R_{fe}$ a core-loss resistance of the transformer 5, $I'_{TR,2}$ a transformed secondary current of the transformer 5, a transformed secondary leakage inductance of the transformer 5 and $R'_2$ a transformed secondary ohmic resistance of the transformer 5. The transformed variables $I'_{TR,2}$, $L'_{\sigma 2}$ and $R'_2$ are corresponding variables of the secondary winding 17 of the transformer 5 converted relative to the primary winding 15.

Figure 3:
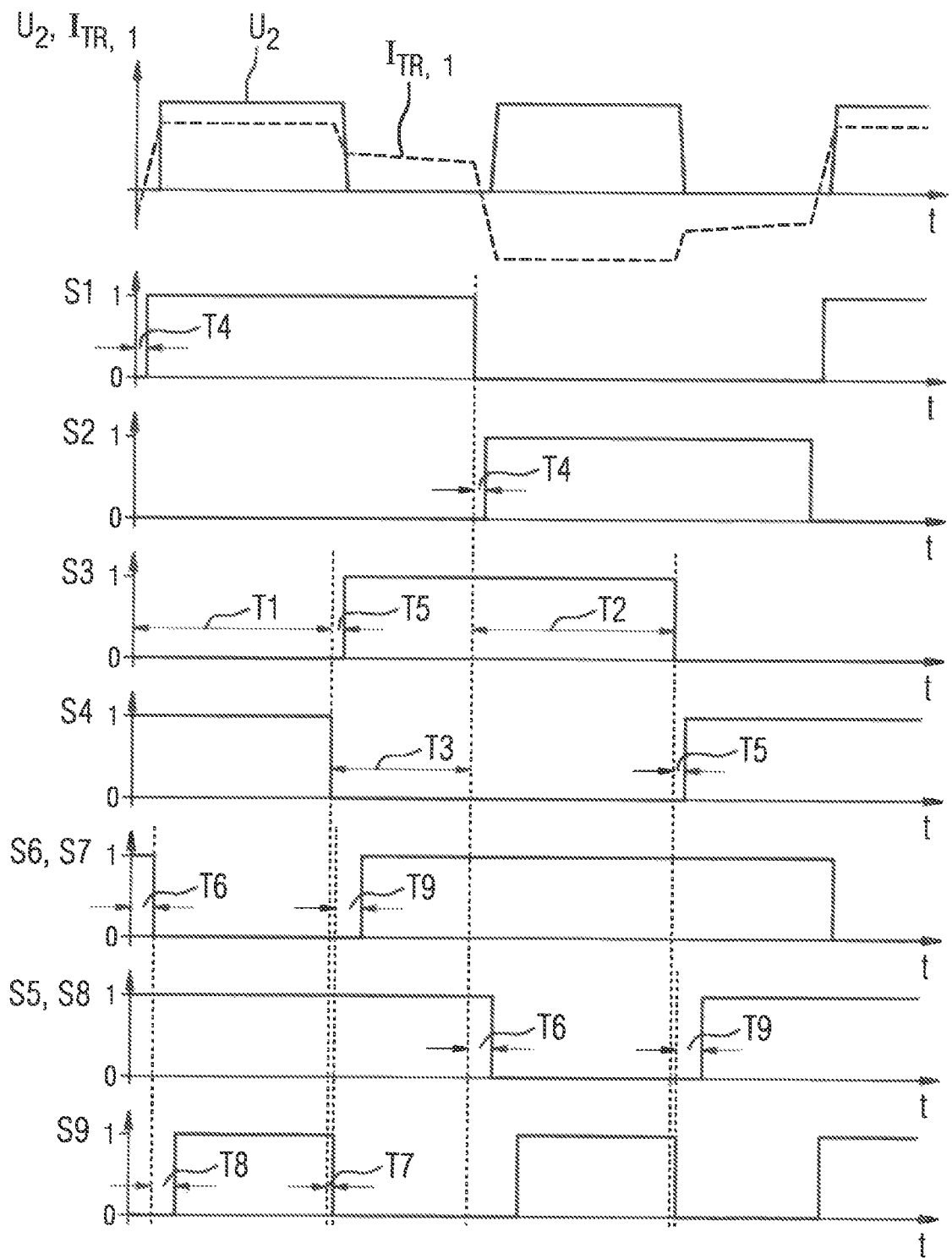
FIG. 3 shows mutually corresponding temporal progressions of a rectified secondary voltage, a primary current and switching states of semiconductor switches of a DC-DC converter.

FIG. 3 shows an inventive method for operating the DC-DC converter 1 on the basis of corresponding progressions of the rectified secondary voltage $U_2$, the primary current $I_{TR,1}$ and switching states S1 to S9 of the semiconductor switches Q1 to Q9 as a function of a time t, wherein Sn signifies the switching state of Qn (for n=1, ..., 9), the value 1 signifying a switched on state of the respective semiconductor switch Q1 to Q9 and the value 0 signifying a switched off state of the respective semiconductor switch Q1 to Q9.

The primary semiconductor switches Q1 to Q4 are actuated such that an AC voltage is generated by the inverter 3 and alternatingly assumes an upper voltage level during a first active phase T1 and during a second active phase T2, assumes a low voltage level. Between two successive active phases T1, T2, the transformer 5 is operated in a freewheeling phase T3 in which the primary winding 15 is short circuited, i.e. in which both ends of the primary winding 15 are placed at the same electrical potential by the primary semiconductor switches Q1 to Q4.

In each first active phase T1, switching takes place through switching off the second primary semiconductor switch Q2 and switching on the first primary semiconductor switch Q1 of a first half-bridge of the inverter full-bridge. In each second active phase T2, switching takes place through switching off the first primary semiconductor switch Q1 and switching on the second primary semiconductor switch Q2 of the first half-bridge of the inverter full-bridge. A first dead time T4 lies between the switching-off of a primary semiconductor switch Q1, Q2 and the switching-on of the respective other primary semiconductor switch Q1, Q2 of the first half-bridge of the inverter full-bridge.

In each freewheeling phase 13, switching takes place through the switching-off of a primary semiconductor switch Q3, Q4 and the switching-on of the respective other primary semiconductor switch Q3, Q4 of the second half-bridge of the inverter full-bridge. A second dead time T5 lies between the switching-off of a primary semiconductor switch Q3, Q4 and the switching-on of the respective other primary semiconductor switch Q3, Q4 of the second half-bridge of the inverter full-bridge.

The clamping assembly 9 is switched off by the additional semiconductor switch Q9 after the start of each freewheeling phase T3 and is switched on after the start of each active phase T1, T2.

The secondary semiconductor switches Q5 to Q8 are actuated such that the rectifier 7 is switched active after the start of each active phase T1, T2 and are switched passive after each switching-off of the clamping assembly 9. In the switching-passive of the rectifier 7, all the semiconductor switches Q5 to Q8 of the rectifier full-bridge are switched on. In the switching-active of the rectifier 7, however, the first semiconductor switch Q5, Q7 of one half-bridge and the second semiconductor switch Q6, Q8 of the respective other half-bridge of the rectifier full-bridge are switched off.

A switching-active delay duration T6 is applied between the start of each active phase T1, T2 and the switching-active of the rectifier 7. The switching-active delay duration T6 is determined such that the rectifier 7 is switched active at a time point at which a commutation process of the secondary semiconductor switches Q5 to Q8 after the start of the respective active phase T1, T2 is entirely or almost completed. By this means, advantageously, a switching-active of the rectifier 7 after the end of the commutation process, which corresponds to a secondary side short circuiting of the transformer 5 and would lead to large currents, and losses caused thereby, is prevented. Through a switching-active of the rectifier 7 as shortly as possible before the end of the commutation process, conductive losses which would arise in too early a switching-active of the rectifier 7 by means of a current flow through body diodes of the secondary semiconductor switches Q5 to Q8 are also prevented.

The commutation duration of the commutation process can be calculated to a good approximation with the following equation:

$$\Delta t = \frac{1}{U_{in} \cdot a} \cdot \left( L_{\sigma 1} + \frac{L'_{\sigma 2}}{1 + \frac{L'_{\sigma 2}}{L_h}} \right) \cdot \left( I_L(t_0) - \left( I_{TR,1}(t_0) + \frac{U_{in} \cdot t_{on}}{2 \cdot L_h} \right) \cdot a \right), \quad [1]$$

where a is the transformation ratio of the transformer 5, $I_L(t_0)$ is the choke current $I_L$ at the time point $t_0$ of the start of the respective active phase T1, T2, $I_{TR,1}(t_0)$ is the primary current $I_{TR,1}$ at the time point $t_0$ and $t_{on}$ is the duration of the preceding active phase T1, T2.

Equation [1] is therefore preferably used to determine the switching-active delay duration T6, wherein the switching-active delay duration T6 is preferably formed by subtraction of a pre-determinable safety duration from the commutation duration calculated with equation [1]. The subtraction of the safety duration from the commutation duration calculated with equation [1] advantageously takes account thereof that equation [1] provides only an approximation of the commutation duration and the values of the inductances and that the measurement values of the currents have tolerances.

Equation [1] is, for example, transformed into an algorithm with which the commutation duration is continuously recalculated by the control unit 11 and therefrom the switching-active delay duration T6 is determined. This advantageously enables the secondary semiconductor switches Q5 to Q8 to be fully activated during a commutation process until shortly before the end of the commutation process and thereby to prevent conductive losses which would otherwise arise due to a current through body diodes of secondary semiconductor switches Q5 to Q8.

Between the start of each freewheeling phase T3 and the switching-off of the clamping assembly 9, a switching-off delay duration T7 is applied. The switching-off delay duration T7 is used as a manipulated variable for regulating the primary current $I_{TR,1}$, which flows during the freewheeling phase T3 as a primary freewheeling current through the primary winding 15 of the transformer 5 and is regulated by the switching-off delay duration T7 to a target value. The fact that the primary freewheeling current can be influenced by the clamping assembly 9 is made use of herein, whereby the switching-off delay duration T7 has a significant influence on the size of the primary freewheeling current, since the larger the switching-off delay duration T7 is, the smaller is the primary freewheeling current. The target value of the primary freewheeling current is determined, for example, dependent upon the input DC voltage $U_{in}$ and/or upon the output current $I_{out}$ in order to reduce conductive losses of the primary semiconductor switches Q1 to Q4 caused by primary freewheeling currents and to optimize the efficiency of the DC-DC converter 1. In order to adjust the switching-off delay duration T7, for example, a microcontroller with high-resolution pulse width modulation modules is used.

Apart from the regulation of the primary freewheeling current, the clamping assembly 9 enables the clamping of the secondary voltage (so-called active clamping). Through the switching-on of the additional semiconductor switch Q9, in an active phase T1, T2, the clamping capacitor C1 absorbs "excess energy" from the leakage inductances of the transformer 5 and feeds it back in the second half of the active phase T1, T2. By this means, advantageously, oscillations of the secondary voltage are significantly reduced or prevented. The clamping of the secondary voltage thereby takes place almost loss-free since the energy is not converted into heat, but is fed back again. Only the conductive and switching losses of the additional semiconductor switch Q9 and small losses in the clamping capacitor C1 are incurred. As compared with a DC-DC converter 1 without a clamping assembly 9, by this means, secondary semiconductor switches Q5 to Q8 in the rectifier 7 can advantageously be used with a significantly smaller blocking voltage and therefore a significantly better conductive resistance.

The clamping assembly 9 is switched on after the start of an active phase T1, T2 at a time point at which the rectified secondary voltage $U_2$ of the transformer 5 has reached an end value, i.e. has been fully built up, in this active phase T1, T2. For this purpose, a switching-on delay duration T8 is applied between the switching-active of the rectifier 7 and the switching on of the clamping assembly 9. For the switching-on delay duration T8, for example, a table is defined, dependent upon the input DC voltage $U_{in}$ and/or the output current $I_{out}$.

Furthermore, a switching-passive delay duration T9 is specified and the rectifier 7 is switched passive after each switching-off of the clamping assembly 9, delayed by the switching-passive delay duration T9.

An exemplary embodiment of the invention provides that the transformer 5 is configured as an air gap transformer.

Differences and advantages of an embodiment of the DC-DC converter 1 are illustrated below by reference to FIGS. 4 and 5, with a transformer 5 configured as an air gap transformer as compared with an embodiment of the DC-DC converter 1 having a transformer 5 without an air gap.

Figure 4:
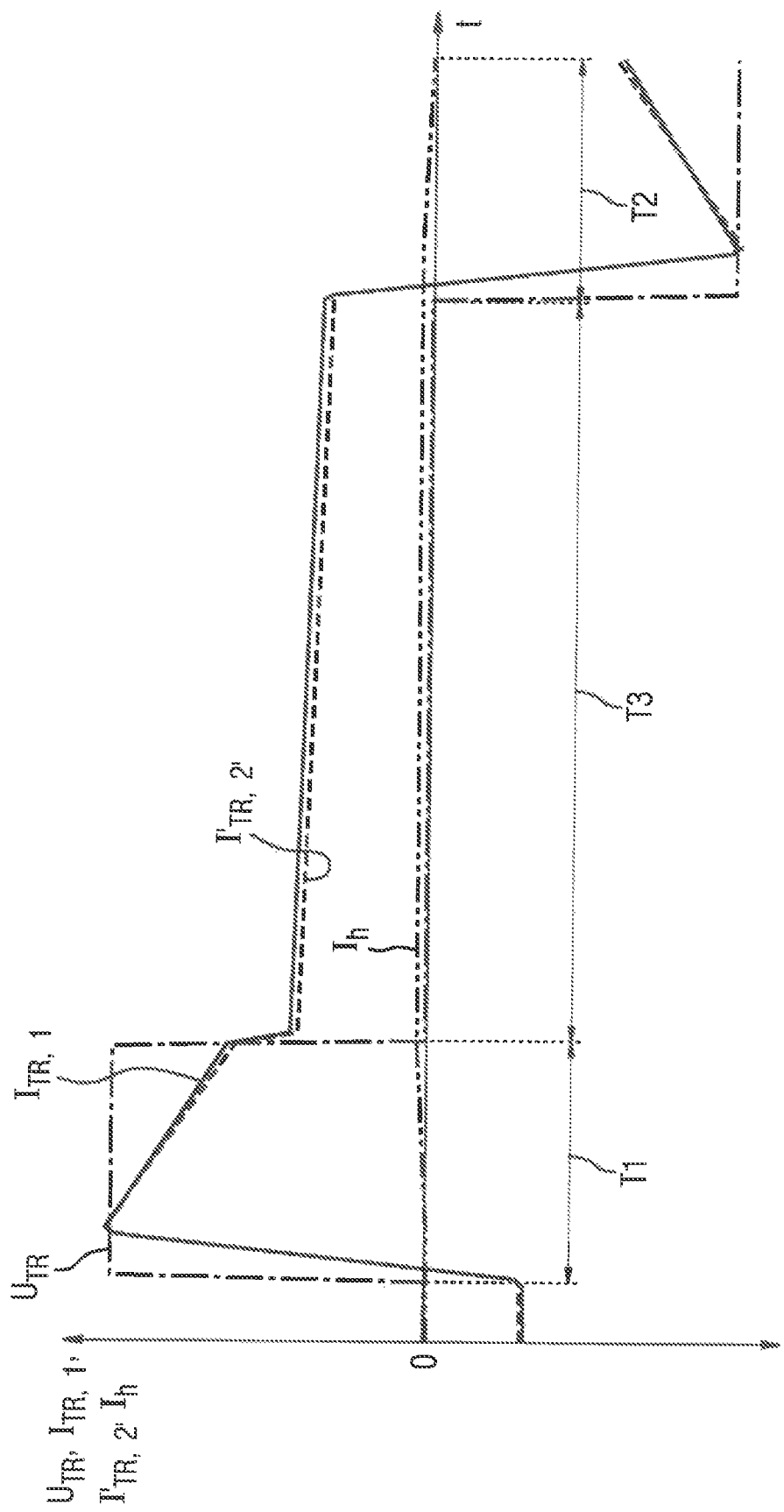
FIG. 4 shows temporal progressions of a primary voltage, a primary current, a magnetization current and a transformed secondary current in an embodiment of a DC-DC converter having a transformer without an air gap.

FIG. 4 shows temporal progressions of the primary voltage $U_{TR}$, the primary current $I_{TR,1}$, the magnetization current $I_h$ and the transformed secondary current $I'_{TR,2}$ in an embodiment of the DC-DC converter 1 having a transformer 5 without an air gap.

FIG. 5 shows temporal progressions of the primary voltage $U_{TR}$, the primary current $I_{TR,1}$, the magnetization current $I_h$ and the transformed secondary current $I'_{TR,2}$ in an embodiment of the DC-DC converter 1 having a transformer 5 with an air gap, wherein apart from the air gap of the transformer 5, the DC-DC converter 1 is configured and operated like the DC-DC converter 1 on which FIG. 4 is based.

FIGS. 4 and 5 show firstly that the amount of the primary current reaches its maximum shortly after the start of an active phase T1, T2. This is due to the fact that a certain time elapses before the commutation is completed in the rectifier 7. Until then, the primary current $I_{TR,1}$ continues to rise. FIGS. 4 and 5 show that the maximum of the primary current $I_{TR,1}$ is significantly higher in a transformer 5 without an air gap. This is due to the magnetization current $I_h$, which in a transformer 5 with an air gap has a significantly higher value than in a transformer 5 without an air gap. At the start of the active phase T1, the magnetization current $I_h$ is still negative and thus offsets a large part of the current peak. From this arise two essential advantages of the use of a transformer 5 with an air gap. Firstly, the RMS value of the primary current $I_{TR,1}$ is somewhat reduced thereby. This is advantageous, above all, in the example shown in FIGS. 4 and 5 since it is here that the largest currents in the whole DC-DC converter 1 flow and thereby the largest conductive losses also arise. Secondly, due to the smaller current peak, an input filter (not shown in FIG. 1) is less severely loaded and smaller losses are also incurred there. Above all, however, the input filter can be configured correspondingly smaller and the conducted interference is nevertheless kept to the same level.

In the freewheeling phase T3 following the active phase T1, T2. FIGS. 4 and 5 indicate a further notable feature. Whereas the primary current $I_{TR,1}$ is of equal size in both cases because it has been regulated with the aid of the clamping assembly 9 to a desired value, there is a marked difference in the transformed secondary current $I'_{TR,2}$ which in the case of the transformer 5 with an air gap is significantly smaller than in the case of the transformer 5 without an air gap. This difference is again attributable to the significantly larger magnetization current $I_h$ in the air gap transformer, since the primary current $I_{TR,1}$ is made up from the transformed secondary current and the magnetization current $I_h$. If the magnetization current $I_h$ is larger, given the same primary current $I_{TR,1}$, then $I'_{TR,2}$ is correspondingly smaller. Given the same primary current $I_{TR,1}$, the smaller main inductance $L_h$ of the air gap transformer consequently ensures a significant reduction of the secondary transformer current $I_{TR,2}$ and therefore also its RMS value. This advantage results only in relation to the clamping assembly 9 which enables the setting of the primary freewheeling current. Without the clamping assembly 9, the smaller main inductance $L_h$ would only have the consequence that on the primary side (other conditions remaining the same), a larger freewheeling current would flow, whereas on the secondary side, there would be practically no change.

Apart from these advantages with regard to the operation of the DC-DC converter 1, the air gap transformer has a further use in relation to the operational safety. In principle, in the case of a full-bridge converter, due to slight asymmetries, it can arise that the primary voltage $U_{TR}$ receives a direct current component. This can arise, for example, due to not completely symmetrical actuation signals or asymmetrical behavior of the drivers of the primary semiconductor switches Q1 to Q4. If the direct current component is large enough, the transformer 5 can become saturated, which absolutely must be prevented.

Typically, therefore, either a primary side peak current regulation is utilized, which sets the peak value of the primary current $I_{TR,1}$. Or, a correspondingly dimensioned capacitor which effectively prevents the DC component is connected in series with the transformer 5. The former is not possible, due to the entirely different current patterns that arise in a DC-DC converter 1 with the clamping assembly 9 as compared with a conventional DC-DC converter 1 without a clamping assembly 9, since the maximum of the amount of the primary current $I_{TR,1}$ can already occur shortly after the start of an active phase T1, T2. A capacitor connected in series with the transformer 5 has the disadvantage that a further component is needed which gives rise to further losses and costs and requires space on the assembly. An adequately dimensioned capacitor would have considerable dimensions in this implementation.

In place of this, the air gap transformer is used for a larger tolerance with regard to direct current components. Theoretically therefore, it would be just as quick in the event of an asymmetry of the voltage time areas to reach saturation as the otherwise identically constructed transformer 5 without an air gap. Since the saturation current is much greater, however, a significantly greater direct current component of the primary current $I_{TR,1}$ would have to flow. However, this direct current component is counteracted by the ohmic resistances of the air gap transformer itself, the conductor tracks on the circuit board and the primary semiconductor switches Q1 to Q4. This means that the larger the saturation current of the transformer 5, the greater the asymmetries may be. The tolerance to asymmetries in the actuation of the primary semiconductor switches Q1 to Q4 is thereby so large when an air gap transformer is used that a capacitor in series with the air gap transformer can be dispensed with.

Although the invention has been illustrated and described in detail based on preferred exemplary embodiments, the invention is not restricted by the examples given and other variations can be derived therefrom by a person skilled in the art without departing from the protective scope of the invention.

What is claimed is:

1. A DC-DC converter, comprising:
   an inverter having four primary semiconductor switches interconnected to form an inverter full-bridge for converting a DC input voltage into an AC voltage,
   a transformer constructed as an air gap transformer and comprising a primary winding arranged in a bridge branch of the inverter full-bridge and a secondary winding,
   a rectifier connected to the secondary winding for rectifying a secondary voltage of the transformer,
   a clamping assembly comprising an additional semiconductor switch and a clamping capacitor connected in series with the additional semiconductor switch, with the rectified secondary voltage of the transformer applied to the clamping assembly, and
   a control unit configured to control the primary semiconductor switches and the additional semiconductor switch such that
   the inverter generates an AC voltage which alternatingly assumes an upper voltage level during a first active phase and a lower voltage level during a second active phase,
   the transformer is operated between two successive active phases in a freewheeling phase in which the primary winding is short-circuited,
   the clamping assembly is switched off by the additional semiconductor switch following a start of each freewheeling phase and switched on again after a start of each first or second active phase,
   wherein a switching-off delay duration for switching off the clamping assembly following the start of a freewheeling phase is used as a control variable for regulating a primary current, which flows during the freewheeling phase as a primary freewheeling current through the primary winding of the transformer, to a target value,
   wherein the target value of the primary freewheeling current is determined in dependence of a DC input voltage and/or an output current of the DC-DC converter.

2. The DC-DC converter of claim 1, wherein the rectifier comprises four interconnected secondary semiconductor switches which form a rectifier full-bridge and are controlled by the control unit, with the secondary winding of the transformer being arranged in a bridge branch of the rectifier full-bridge, and the clamping assembly being connected in parallel with the rectifier full-bridge.

3. The DC-DC converter of claim 1, wherein the rectifier comprises an output side having an LC filter composed of a choke and a filter capacitor.

4. The DC-DC converter of claim 1, wherein each primary semiconductor switch and/or the additional semiconductor switch are constructed as a field-effect transistor.

5. A method for operating a DC-DC converter, wherein generating with an Inverter of the DC-DC converter an AC voltage which alternatingly assumes an upper voltage level during a first active phase and a lower voltage level during a second active phase,
   operating a transformer constructed as an airgap transformer and having a primary winding receiving the AC voltage between two successive active phases in a freewheeling phase in which the primary winding is short circuited,
   following a start of each freewheeling phase, switching a clamping assembly, which receives a rectified secondary voltage from a secondary winding of the transformer, off with an additional semiconductor switch and switching the clamping assembly on again after a start of each first or second active phase,
   using a switching-off delay duration, when the clamping assembly is switched off following the start of a freewheeling phase, as a control variable for regulating a primary current, which flows during the freewheeling phase as a primary freewheeling current through the primary winding of the transformer, to a target value, and
   determining the target value of the primary freewheeling current in dependence of a DC input voltage and/or an output current of the DC-DC converter.

6. The method of claim 5, further comprising switching the clamping assembly on after the start of the first or second active phase at a time when the rectified secondary voltage of the transformer has reached an end value in the respective active phase.

7. The method of claim 5, wherein the rectified secondary voltage is produced by four interconnected secondary semiconductor switches which form a rectifier full-bridge and are controlled by a control unit, with the secondary winding of the transformer being arranged in a bridge branch of the rectifier full-bridge, the method further comprising actively switching the rectifier full-bridge after the start of each first or second active phase with a switching delay having an active switching delay duration.

8. The method of claim 7, wherein the active switching delay duration is shorter than or equal to a commutation duration of a secondary-side commutation process after the start of the respective active phase.

9. The method of claim 8, wherein the active switching delay duration is determined in dependence of at least one of the following parameters:

a DC input voltage, a main Inductance of the transformer, a primary leakage Inductance of the transformer, a secondary leakage inductance of the transformer, a duration of a preceding active phase, an output current of the DC-DC converter at a time of the start of the first or second active phase, and a primary current through the primary winding at the time of the start of the first or second active phase.

10. The method of claim 8, further comprising specifying a passive switching delay duration and switching the rectifier passive each time the clamping assembly is switched-off with a switching delay having the passive switching-off delay duration.

* * * * *